US009276624B2

(12) United States Patent
Karacaoglu et al.

(10) Patent No.: US 9,276,624 B2
(45) Date of Patent: Mar. 1, 2016

(54) ANTENNA SYSTEM WITH SELF-IDENTIFYING ANTENNA

(75) Inventors: Ulun Karacaoglu, San Diego, CA (US); Robert Paxman, Hillsboro, OR (US); Anand S Konanur, San Jose, CA (US)

(73) Assignee: Intel Corporation, Santa CLara, CA (US)

( * ) Notice: Subject to any disclaimer, the term of this patent is extended or adjusted under 35 U.S.C. 154(b) by 0 days.

(21) Appl. No.: 13/992,528

(22) PCT Filed: Dec. 29, 2011

(86) PCT No.: PCT/US2011/067913
§ 371 (c)(1),
(2), (4) Date: Nov. 18, 2013

(87) PCT Pub. No.: WO2013/101099
PCT Pub. Date: Jul. 4, 2013

(65) Prior Publication Data
US 2014/0302808 A1    Oct. 9, 2014

(51) Int. Cl.
*H04M 1/00* (2006.01)
*H04B 1/18* (2006.01)
*H01Q 1/22* (2006.01)

(52) U.S. Cl.
CPC ............... *H04B 1/18* (2013.01); *H01Q 1/2225* (2013.01)

(58) Field of Classification Search
CPC ........................... H04B 7/0608; H04B 7/0802
USPC .................. 455/562.1, 575.7, 97, 129, 279.1; 342/434, 437; 343/702
See application file for complete search history.

(56) References Cited

U.S. PATENT DOCUMENTS

| | | | | |
|---|---|---|---|---|
| 6,853,197 B1* | 2/2005 | McFarland | ............. | H01Q 1/242 324/549 |
| 7,171,238 B2* | 1/2007 | Nicholson | ................ | H04B 1/18 333/17.1 |
| 7,505,740 B2* | 3/2009 | Higgins et al. | ............... | 455/90.3 |
| 7,930,010 B2* | 4/2011 | Johansson et al. | ......... | 455/575.7 |
| 8,004,412 B2* | 8/2011 | Chen | .......................... | 340/572.7 |
| 8,108,020 B2* | 1/2012 | Anderson et al. | .......... | 455/575.7 |

(Continued)

OTHER PUBLICATIONS

"International Application Serial No. PCT/US2011/067913, Search Report mailed Sep. 19, 2012", 3 pgs.

(Continued)

*Primary Examiner* — Sonny Trinh
(74) *Attorney, Agent, or Firm* — Schwegman Lundberg & Woessner, P.A.

(57) ABSTRACT

According to one embodiment disclosed herein, there is provided an antenna module including a self-identification mechanism that may be used by one or more wireless circuits for management purposes. The self-identification mechanism may, for example, take the form of an integrated circuit (IC) device or chip that stores a serial number that may function as a unique identifier for an antenna on which it is mounted or associated. In one embodiment, a wireless module, for example containing RF components for sending and receiving signals from the antenna, queries the serial number device, and acquires the serial number for the antenna. The wireless module can use the serial number for any number of purposes, and in particular to verify that the antenna connected is a compliant antenna that will operate within the range, within the limits, and/or with the performance specified for the radio circuits within the wireless module.

22 Claims, 9 Drawing Sheets

(56) References Cited

U.S. PATENT DOCUMENTS

| | | | |
|---|---|---|---|
| 8,488,792 B2* | 7/2013 | Lagnado | H01Q 1/2258 343/700 R |
| 2005/0049020 A1 | 3/2005 | Higgins et al. | |
| 2006/0085403 A1* | 4/2006 | Harrison et al. | 707/3 |
| 2007/0063771 A1* | 3/2007 | Pan et al. | 330/149 |
| 2009/0109117 A1 | 4/2009 | Johansson et al. | |
| 2011/0243274 A1 | 10/2011 | Kelin | |

OTHER PUBLICATIONS

"International Application Serial No. PCT/US2011/067913, Written Opinion mailed Sep. 19, 2012", 4 pgs.

* cited by examiner

ANTENNA SYSTEM WITH SELF-IDENTIFYING ANTENNA

PRIORITY APPLICATION

This application is a U.S. National Stage Application under 35 U.S.C. 371 from International Application No. PCT/US2011/067913, filed Dec. 29, 2011, which is hereby incorporated by reference in its entirety.

TECHNICAL FIELD

The present technology relates generally to the field of wireless communications, and more particularly to antennas used in wireless communications.

BACKGROUND

Regulatory compliance for a wireless device is procured with a certain antenna paired to the device. In theory, it is difficult for a user to replace the original antenna with an aftermarket antenna which offers increased performance. However, it is increasingly easy to find aftermarket antennas for both desktop PCs and notebooks PCs with (SubMiniature version A) SMA, Reverse SMA or Micro-coax connectors. Care must be taken when matching antennas with certain devices as the devices may not meet regulatory standards when paired with certain antennas. Also, antenna tuners and matching networks are being integrated into wireless modules (or antennas) to enable 'per device' optimization (e.g., optimizing wireless transmission characteristics per specific device) and 'in use' optimization (e.g., optimizing wireless transmission characteristics based upon sensed usages that would result in VSWR (voltage standing wave ratio) changes) of VSWR and efficiency for notebooks, tablets and phones. Typically a single radio module may be integrated with several different antennas based on the device form factor.

Figure 1A:
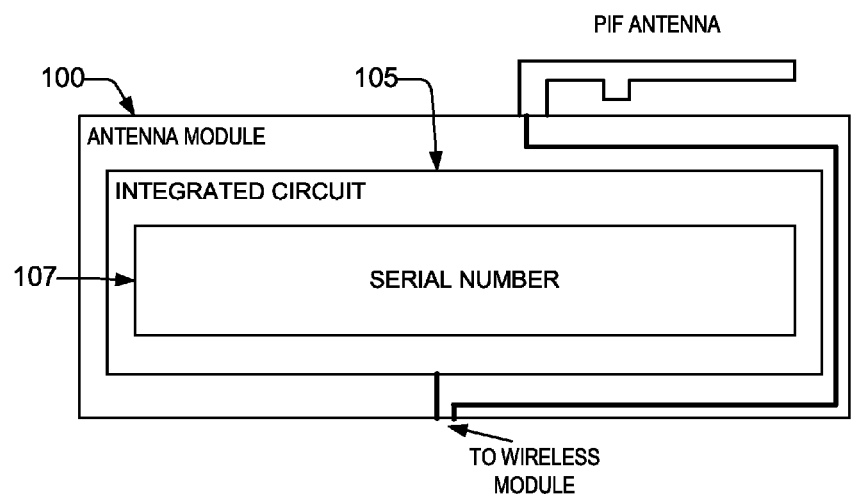
FIG. 1A shows a schematic of an antenna module according to some examples of the present disclosure.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

Disclosed in some examples are methods, devices, and machine-readable media which allow a wireless module to identify the antenna to which it is connected. Based on the connected antenna the wireless module may modify one or more parameters.

Figure 1B:
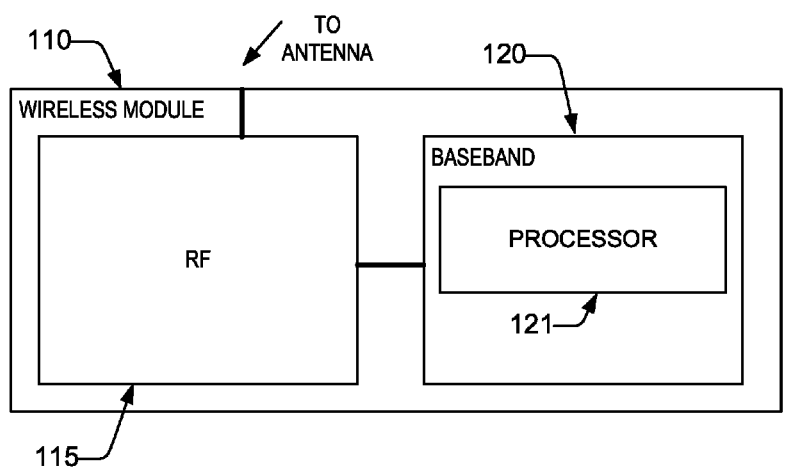
FIG. 1B shows a schematic of a wireless module according to some examples of the present disclosure.

According to one embodiment, illustrated in FIGS. 1A and 1B, there is provided an antenna module 100 and a wireless module 110, wherein the antenna module 100 includes a built-in self-identification device, such as an integrated circuit (IC) device or chip 105 that stores a unique identifier 107, for example a 64-bit serial number for an antenna on which it is attached, mounted, fastened together, glued together, contained together, or otherwise physically paired, for example in a plastic module. More generally, the unique identifier 107 is alternatively referred to herein as machine-readable identification data. The wireless module 110 may contain radio frequency (RF) processing circuits or components, such as an RF chip 115 and a baseband chip 120. The wireless module 110 may query the device 105 and acquire the unique identifier 107, for example the serial number, for the antenna. This query may be done one-time at initialization of the wireless module 110, periodically upon detection of a change in the antenna or antenna module, or at other times.

Figure 2:
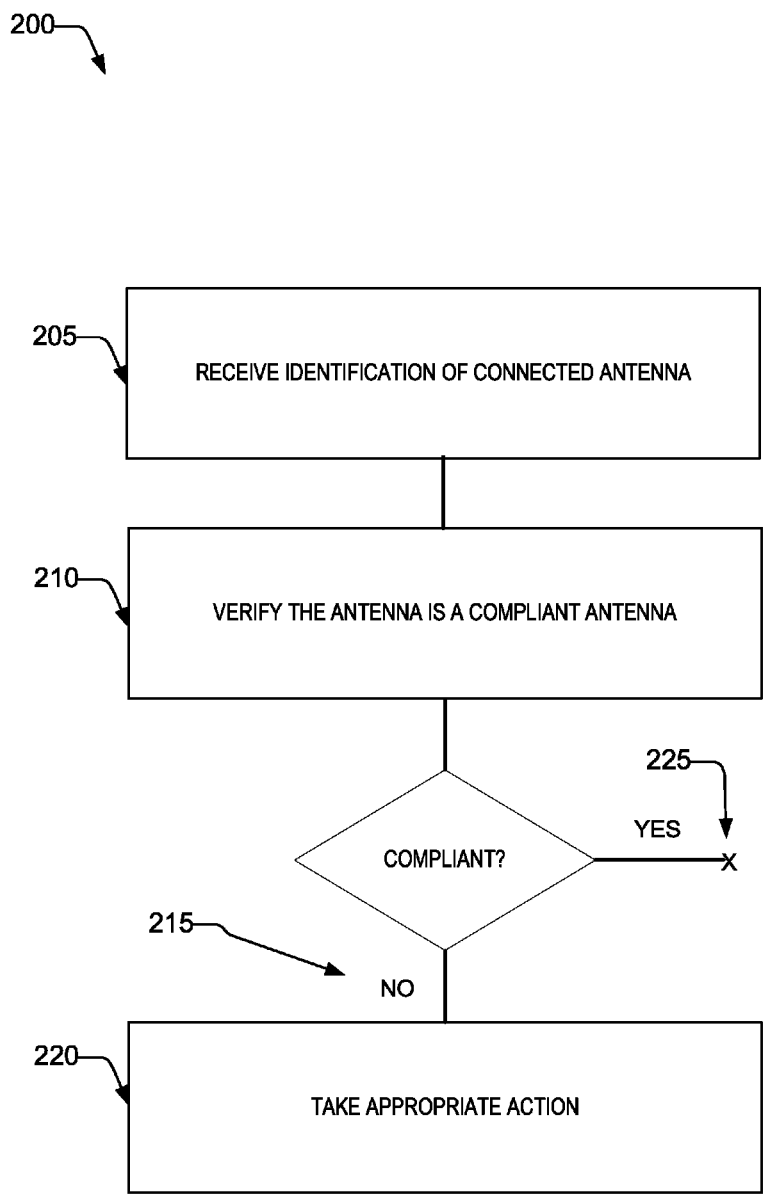
FIG. 2 shows a flowchart of a method of verifying antenna compliance and taking appropriate action according to some examples of the present disclosure.

FIG. 2 illustrates one example method 200 of verifying antenna compliance. The wireless module 110 may receive the connected antenna's identification (205). The reception of the identification, e.g., the unique identifier, may be the result of a request sent by the wireless module 110, or may be received without a request from the wireless module from the antenna module (e.g., upon power up, or at a predetermined interval, or the like). The wireless module 110 can use the unique identifier for any number of purposes, for example to verify that the antenna connected is an appropriate antenna (210) that will operate within the range, within the limits, and/or with the performance specified for the radio circuits within the wireless module 110. This may be accomplished, for instance, by ensuring that the unique identifier matches an expected number or is within a predefined or approved range of unique identifiers, for example a range of serial numbers. The unique number of set of unique numbers that are expected or approved may be pre-determined based upon earlier testing and may be programmed into the wireless module 110. In some examples, the set of unique numbers that are expected or approved may be updated by an external computing device. Thus for example, if additional antennae are tested and found to operate within the range, limits, or performance required, the serial numbers (or range of serial numbers) for that antennae may be added to the approved list of devices.

Additionally, in another example embodiment, the unique identifier can be categorized in various ways (even or odd, modulo (n) (the remainder when divided by a number 'n'), and the like), and be used to distinguish between one or many types of compliant antennas. Example antennas may include dipole, slot, monopole, loop, patch, and PIFA (planar inverted F) antenna types. These antennas may have applications in tablet computers, notebook computers, cellular telephones, smart phones, Frequency Modulation (FM) radios, Amplitude Modulation (AM) radios, televisions, or any other application in which an antenna is used to receive electromagnetic waves. The techniques presently disclosed allows for regulatory compliance of these antennas to be ensured and/or for changes to various parameters to be made so as to ensure compliance or optimal performance. If the antenna is a compliant antenna 225, then no further action may need to be taken.

According to another example embodiment, also illustrated in FIG. 2, if (215) the antenna module 110 does not respond with the correct unique identifier, however determined by the wireless module 110, the module 110 will react with appropriate action (220), for example as may be programmed in the wireless module. For example, the wireless module may throttle its power or disable itself in order to minimize the risk of functioning outside of its approved parameters (e.g., in violation of United States FCC Regulation Part 15). For instance, transmission power can be reduced, when a high gain antenna is indicated by the identification, while the transmission power can be enhanced when a weaker omni antenna is indicated by the identification.

Figure 3:
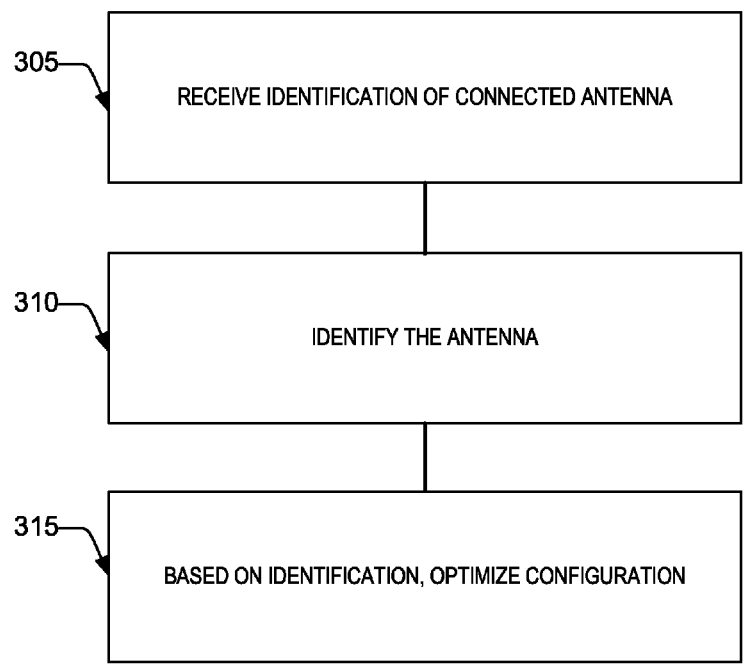
FIG. 3 shows a flowchart of a method of loading specific configuration information based upon identifying the antenna according to some examples of the present disclosure.

In another embodiment illustrated in FIG. 3, the wireless module 110 may receive the identification of the connected antenna (305), identify the antenna (310), and use the acquired identity of the antenna to optimize various wireless configuration parameters (315). In some examples, each antenna identification number or a range of identification numbers may be associated with a parameter profile. The parameter profile may include one or more parameter changes to the wireless module. Example parameter changes may include: the power level, frequency, or firmware configuration. Each target device in which the antenna is to be integrated may have a different unique identifier programmed into the connected antenna 100. Each different device may require different tuning based upon the different impedance characteristics of the device. Identifying the unique identifier of the antenna will allow the wireless module 110 to optimize the wireless configuration parameters to best suit the particular device in which it is installed. In some examples, to accomplish this, the wireless module may load a specific configuration of firmware or tunable/switchable matching components. This allows for operation at a desired efficiency, such as a defined optimum or maximum efficiency. Various example end products may include laptops, mobile devices, other consumer products, industrial devices, household appliances, control system components, or the like.

According to one example embodiment, the antenna management functions described with respect to the figures described above and below herein, are performed by the baseband chip 120, which, in one embodiment, includes microprocessor system components 121 capable of executing one or more computer programs configured to carry out the described methodologies, and/or other programmable circuit components that are configured to acquire the unique identifier 107, and perform any of the management functions herein described, including applying control signals or configuration parameters to other internal circuits of the baseband chip 120 or to the RF chip 115. In other examples, the antenna management functions may be performed by the RF chip 115, or other microprocessors or control logic present on the wireless module 110. In still other examples, the antenna module 100 may contain a microprocessor which may receive an expected identification number, range, or other indicator and make the necessary adjustments at the antenna side or communicate the necessary adjustment to the wireless module 110. Alternatively, the antenna ID can be forwarded to a computing platform separate from the wireless module 110, such as the microprocessor board and associated components of a computing system in the device on which the wireless module 110 is deployed. The management functions are then performed on the separate computing system and control and configuration signals applied back to the wireless module 110.

In one embodiment, for example, the device 105 may be a Maxim DS2401 one wire protocol chip, available from Maxim Integrated Products, Inc., of Sunnyvale, Calif. The DS2401 is an enhanced "silicon serial number" providing a low-cost, electronic registration number that provides an absolutely unique identity that can be determined with a minimal electronic interface, typically, a single port pin of a microcontroller. The DS2401 includes a factory-lasered, 64-bit ROM that includes a unique 48-bit serial number, an 8-bit CRC, and an 8-bit Family Code (01h). Data is transferred serially via a 1-Wire®-type protocol that requires only a single data lead and a ground return. Power for reading and writing the device is derived from the data line itself with no need for an external power source. The DS2401 is fully reverse-compatible with the DS2400 but provides an additional multi-drop capability that enables many devices to reside on a single data line. In other embodiments, any device or chip providing serial number identification capabilities may be used, such as other wireline chips, radio frequency identification (RFID) chips, bar coded chips, or any other devices having similar or different serial number identification capabilities.

Figure 4:
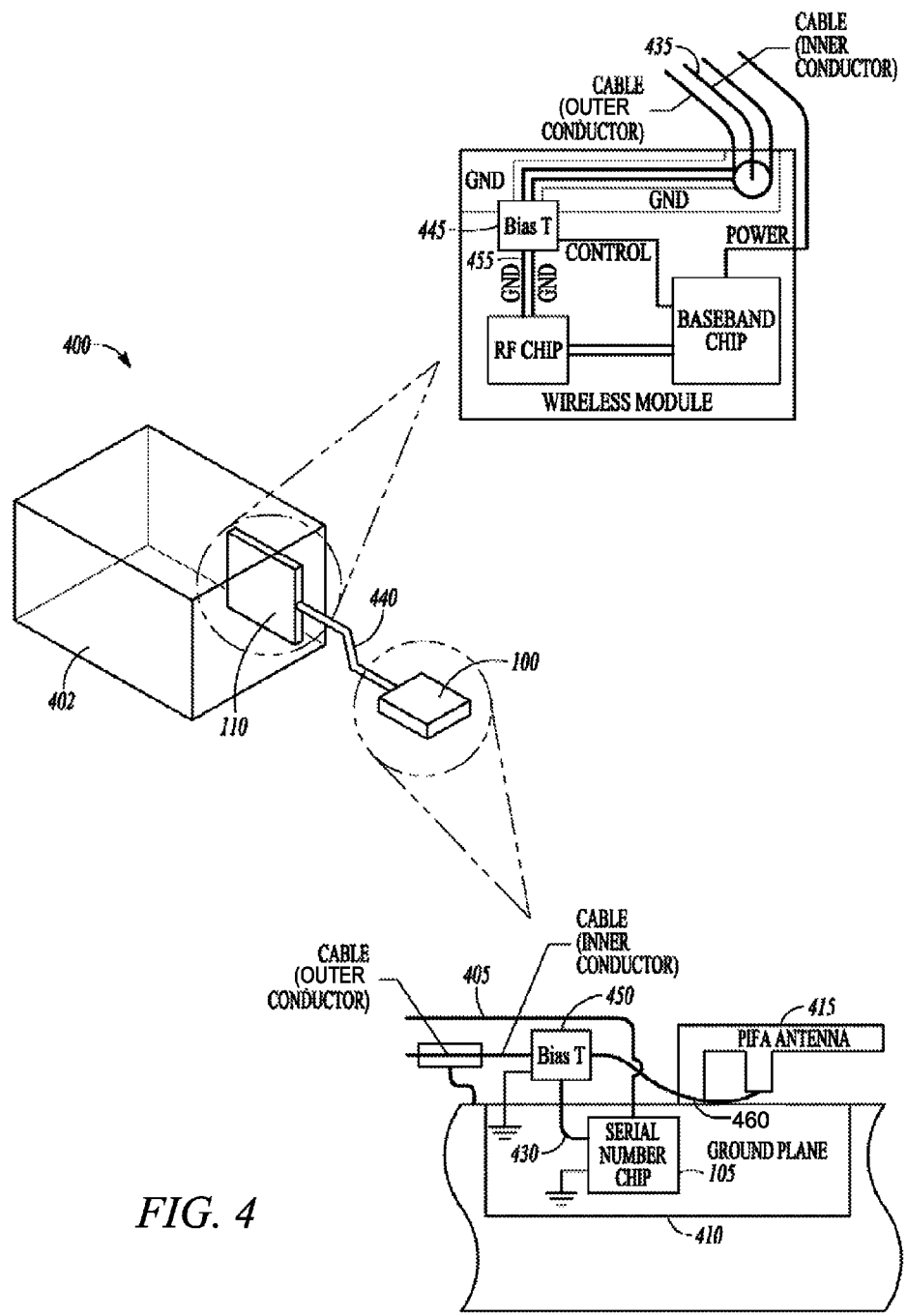
FIG. 4 shows a schematic of a wireless transmission system according to some examples of the present disclosure.

According to another example embodiment illustrated in FIG. 4, the antenna module 100 and wireless module 110 are used on a desktop computer 400 having a chassis 402. In this embodiment, the serial number device 105, for example the DS2401, is supplied with a power signal 405 and shares the ground 410 with the antenna 415. The control signal 430 for the serial number device 105 may be sent from the wireless module 110 over the center conductor 435 of a coax cable 440 connecting the antenna to the module through the use of a Bias-T 445. In the antenna module 110, another Bias-T 450 is used to separate the low frequency control signal from the RF signal 455, which is routed to the antenna feed 460. Additional cables to supply the identification device are thus kept to a minimum.

Figure 5:
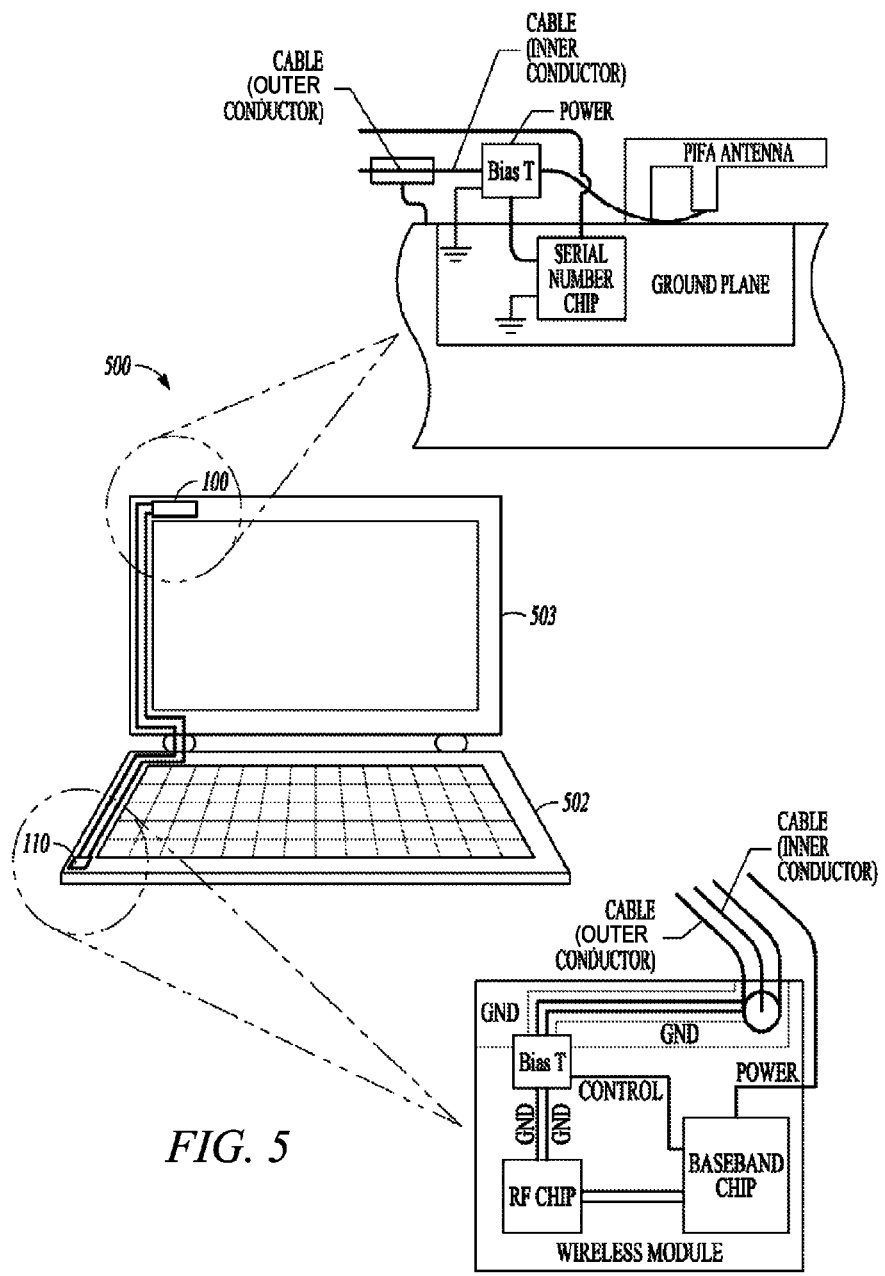
FIG. 5 shows a schematic of a wireless transmission system according to some examples of the present disclosure.

According to another example embodiment illustrated in FIG. 5, the antenna module 100 and wireless module 110 are used on a laptop, notebook, tablet PC or another other computing device or computer 500 having case 502. In this embodiment, the antenna module(s) 100 is embedded inside the case of the laptop, in this example on a hinged cover 503 of the device. Otherwise, the configuration of FIG. 5 is similar to the configuration of FIG. 4.

Figure 6:
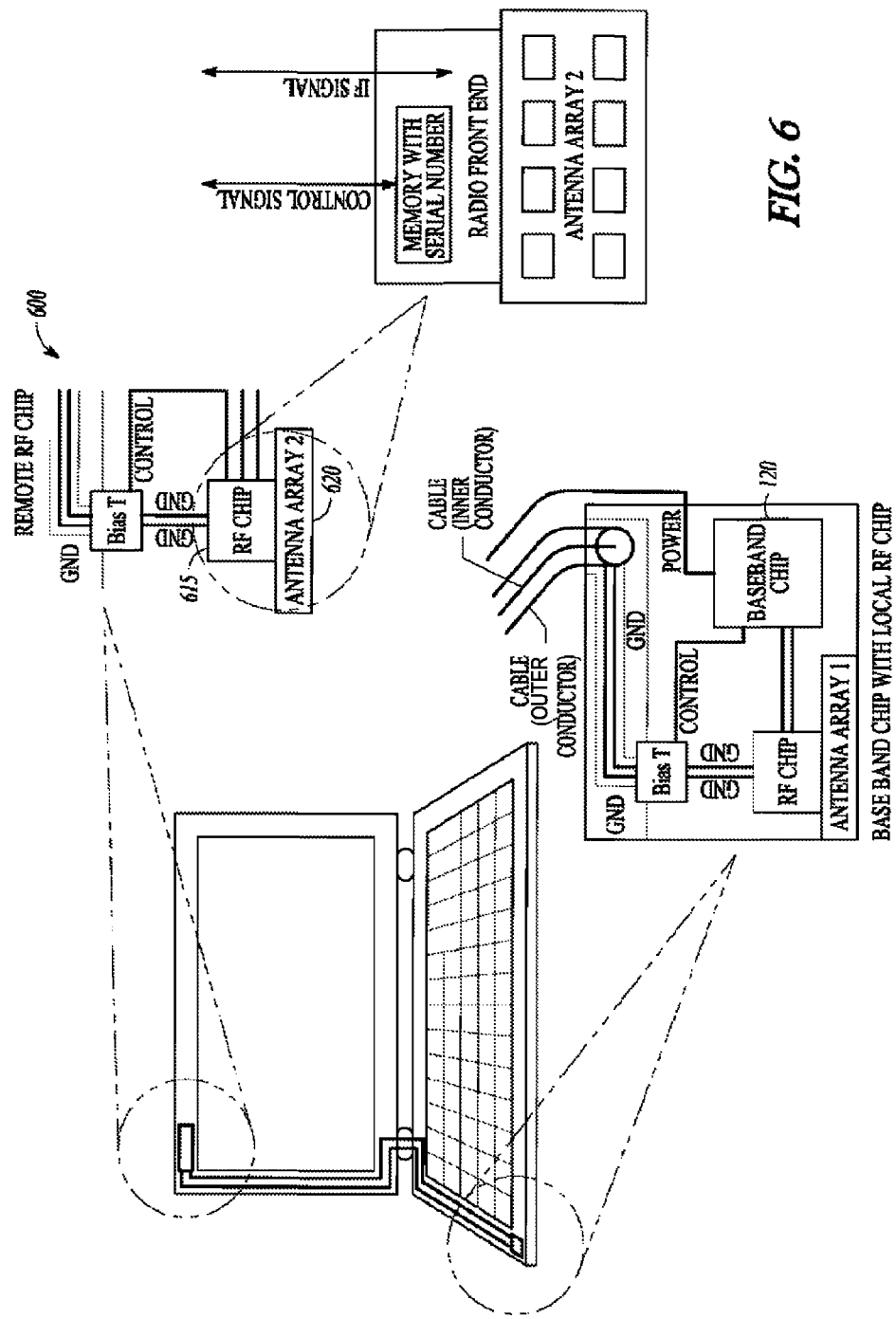
FIG. 6 shows a schematic of a wireless transmission system according to some examples of the present disclosure.

According to another example embodiment illustrated in FIG. 6, a single baseband chip 120 and intermediate frequency chip may interface with one or more remote RF chips 615. In these examples, the antenna array is part of, or connected to, the RF chip. In some examples, these antenna modules 600 may operate at 60 GHz, and utilize phased antenna arrays. These antenna modules 600 require detailed calibration parameters pertaining to the calibration and operation of the antenna array 620 to be employed based upon the exact RF remote chip 615 and the particular influence of the chassis that hosts the RF chip. In some examples, the same SKU (Stock Keeping Unit) of the base band chip 120 may be configured to control multiple different RF remote chips 615. By utilizing the remote RF chip 615 to store a unique identifier identifying the exact antenna array and the particular host chassis, the base band chip may configure the remote RF module embedded in the chassis accordingly. In addition, the cost is reduced as an additional chip to store the unique identifier is not required as the RF chip 615 may be utilized.

Accordingly, with use of the antenna identification and management system herein described, it is not necessary to use obscure or difficult to procure connectors to make it harder to connect aftermarket antennas that may make the wireless solution non-compliant. These connectors can be many times more expensive compared to a generic, easy to find connector. Additionally, for embedded antennas connected to tuner modules, the ready ability to load predefined profiles based on different antenna types is advantageous. The tuning profiles are typically developed for one specific antenna model, and the ability to match the profiles automatically assures good performance and in some cases greater ease or lesser risk of mismatch of antenna to the module during assembly.

Thus, as described above, the present solution uses a serial number chip to associate each antenna with a unique identifier that can be queried by either the module or the host. With the knowledge of the exact antenna connected to it, the module 110 can determine its behavior, transmission and matching settings to optimize performance while maintaining regulatory compliance. Also, non-compliant antennas may result in the module lowering the output power delivered or disabling itself to minimize the risk of operating in a non-compliant state. When used with embedded antennas for laptops, the invention allows for the optimized matching between a module and any one of several types of antennas by allowing the module to alter its configuration to match a particular antenna type without requiring the maintenance of several custom SKUs for each antenna type.

According to one example embodiment, any of the above or below described software or hardware elements and functionality, may be implemented as a combination of one or more modules, as defined further herein below. Further, various methods or techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 7:
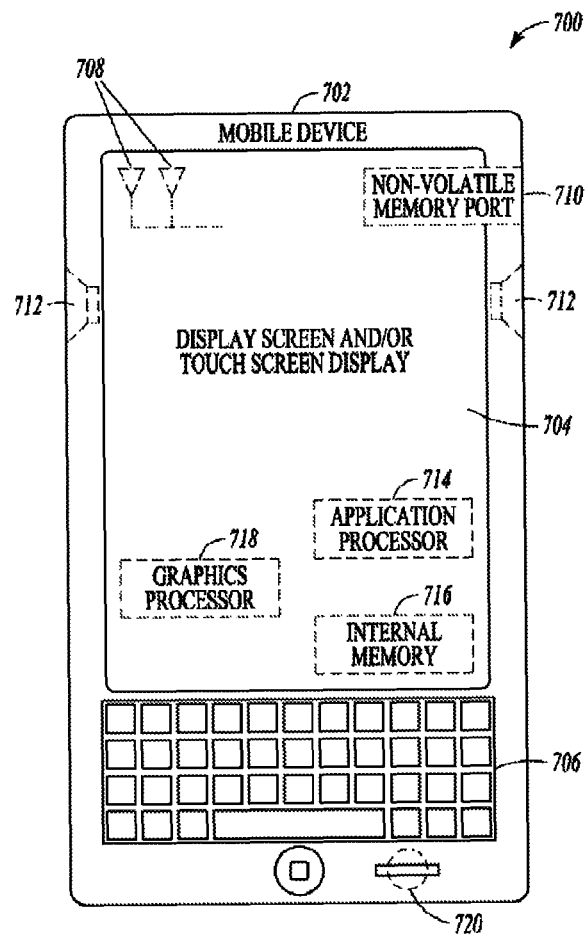
FIG. 7 shows a schematic of a wireless device according to some examples of the present disclosure.

FIG. 7 provides an example illustration of a mobile device 700, such as a user equipment (UE), a mobile station (MS), a mobile wireless device, a mobile communication device, a tablet, a handset, or other type of mobile wireless device with which the wireless module and/or antenna module may be integrated. The mobile device may include one or more antennas 708 configured to communicate with a base station (BS), an evolved Node B (eNB), or other type of wireless wide area network (WWAN) access point. The mobile device may be configured to communicate using at least one wireless communication standard including 3GPP LTE, WiMAX, High Speed Packet Access (HSPA), Bluetooth, and WiFi (e.g., in accordance with an IEEE 802.11 family of standards, for example, IEEE 802.11n-2009). The mobile device 700 may communicate using separate antennas for each wireless communication standard or shared antennas for multiple wireless communication standards. The mobile device may communicate in a wireless local area network (WLAN), a wireless personal area network (WPAN), and/or a wireless wide area network (WWAN). The mobile device 700 may communicate using any number of physical techniques, including Orthogonal Frequency Division Multiplexing (OFDM), Code Division Multiple Access (CDMA), Wideband-CDMA (WCDMA), Time Division Multiple Access (TDMA), or the like.

FIG. 7 also provides an illustration of a microphone 720 and one or more speakers 712 that may be used for audio input and output from the mobile device 700. The display screen 704 may be a liquid crystal display (LCD) screen, or other type of display screen such as an organic light emitting diode (OLED) display. The display screen 704 may be configured as a touch screen. The touch screen may use capacitive, resistive, or another type of touch screen technology. An application processor 714 and a graphics processor 718 may be coupled to internal memory 716 to provide processing and display capabilities. A non-volatile memory port 710 may also be used to provide data input/output options to a user. The non-volatile memory port 710 may also be used to expand the memory capabilities of the mobile device 700. A keyboard 706 may be integrated with the mobile device 700 or wirelessly connected to the mobile device 700 to provide additional user input. A virtual keyboard may also be provided using the touch screen.

Figure 8:
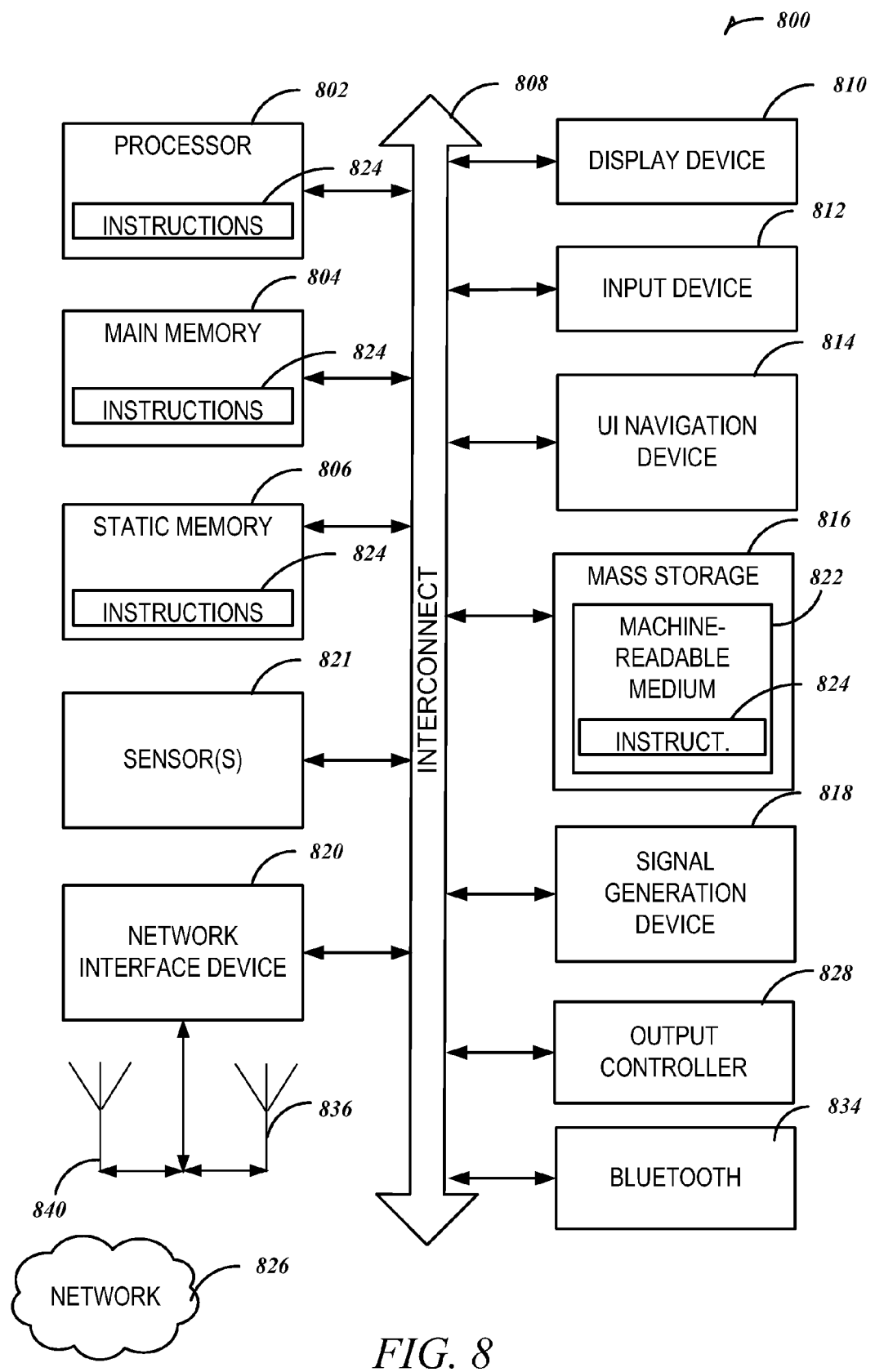
FIG. 8 shows a schematic of a machine according to some examples of the present disclosure.

FIG. 8 is a block diagram illustrating an example computing machine upon which any one or more of the methodologies herein discussed can be run, for example to perform any one of the antenna identification and management operations described above. Alternatively, the computing machine of FIG. 8 may form all or part of the computer platform for any of the computer systems or other devices herein described on which the antenna management solution may be deployed. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 800 includes a processor 802 (e.g., a central processing unit (CPU), a graphics processing unit (GPU) or both), a main memory 804 and a static memory 806, which communicate with each other via a link or interconnect 808 (e.g., a bus). The computer system 800 can further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are a touch screen display. The computer system 800 can additionally include a storage device 816 (e.g., a drive unit), a signal generation device 818 (e.g., a speaker), a network interface device 820 (which may include or operably communicate with one or more antennas 836, 840, transceivers, or other wireless communications hardware) to connect to a network 826 (e.g., the internet), and one or more sensors (not shown), such as a global positioning system (GPS) sensor, compass, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 can also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" can include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 824 can further be transmitted or received over a communications network 826 using a transmission medium via the network interface device 820 utilizing any one of a number of well-known transfer protocols (e.g., HTTP). Examples of communication networks include a LAN, WAN, the Internet, mobile telephone networks, Plain Old Telephone (POTS) networks, and wireless data networks (e.g., Wi-Fi, 3G, and 7G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Other applicable network configurations may be included within the scope of the presently described communication networks. Although examples were provided with reference to a local area wireless network configuration and a wide area internet network connection, it will be understood that communications may also be facilitated using any number of personal area networks, local area networks (LANs), and wide area networks (WANs), using any combination of wired or wireless transmission mediums.

The embodiments described above may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the base station or the UE may include one or more processors and may be configured with instructions stored on a computer-readable storage device.

It should be understood that the functional units or capabilities described in this specification may have been referred to or labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Additional examples of the presently described method, system, and device embodiments include the following, non-limiting configurations. Each of the following non-limiting examples can stand on its own, or can be combined in any permutation or combination with any one or more of the other examples provided below or throughout the present disclosure.

ADDITIONAL EXAMPLES

Example 1

An antenna module comprising: an antenna; an identification circuit physically paired with the wireless antenna, the identification circuit storing machine-readable identification data and to provide the machine-readable identification data responsive to a request for the machine-readable identification data.

Example 2

The antenna module of example 1, wherein the machine-readable identification data is a serial number and is used by a physically coupled wireless module to verify that the antenna is a compliant antenna.

Example 3

The antenna module of any one of examples 1 and 2, wherein the request is sent over a coaxial connection between the antenna module and the wireless module along with an RF signal and wherein the wireless module includes a BIAS-T which is to separate the request from the RF signal.

Example 4

The antenna module of claim 3, wherein the request is routed to the identification circuit and the RF signal is routed to the antenna.

Example 5

A wireless module coupled via a physical connection to an antenna module including machine-readable identification information, the wireless module comprising: a hardware processor to: receive the machine-readable identification data via the physical connection from the antenna module; modify one or more parameters of the wireless module based on the received machine-readable identification data.

Example 6

The wireless module of example 5, wherein the one or more parameters includes at least one of: an amplitude, a frequency, a firmware configuration, or a tuning profile.

Example 7

The wireless module of any of the previous examples, comprising a radio frequency processor and a baseband processor to output a radio frequency signal to the antenna module, and wherein to modify one or more parameters of the wireless module, the hardware processor is to inhibit the output of the radio frequency signal to the antenna module.

Example 8

The wireless module of any one of the previous examples, wherein the hardware processor is to modify one or more parameters of the wireless module based on the received machine-readable identification information by comparing the received machine-readable identification information to one or more expected values, and responsive to determining that the received machine-readable identification information equals one of the expected values, selecting a parameter profile which indicates modifications to the one or more parameters of the wireless module.

Example 9

The wireless module of any one of the previous examples, wherein the hardware processor is to: send a request from the wireless module to the antenna module for requesting the machine-readable identification data.

Example 10

The wireless module of any one of the previous examples, wherein the physical connection comprises a coaxial cable and wherein the hardware processor is to receive the machine-readable identification information over a center conductor of the coax cable, and wherein the wireless module comprises a BIAS-T, which is to separate a signal containing the machine-readable identification data from a radio frequency signal.

Example 11

A method of modifying parameters of a wireless module, the method comprising: receiving at the wireless module, a machine-readable identification data from an antenna module coupled to the wireless module via a physical connection; and modifying one or more parameters of the wireless module based on the received machine-readable identification data.

Example 12

The method of example 11, wherein the one or more parameters includes at least one of: an amplitude, a frequency, a firmware configuration, or a tuning profile.

Example 13

The method of any one of the previous examples, wherein modifying one or more parameters of the wireless module includes inhibiting the output of a radio frequency signal generated by a radio frequency processor and a baseband processor to the antenna module.

Example 14

The method of any one of the previous examples, wherein modifying one or more parameters of the wireless module based on the received machine-readable identification information comprises comparing the received machine-readable identification information to one or more expected values, and responsive to determining that the received machine-readable identification information equals one of the expected values, selecting a parameter profile which indicates modifications to the one or more parameters of the wireless module.

Example 15

The method of any one of the previous examples, comprising: sending a request from the wireless module to the antenna module for requesting the machine-readable identification data.

Example 16

The method of any one of the previous examples, wherein the physical connection comprises a coaxial cable and wherein the machine-readable identification information is received over a center conductor of the coax cable, and wherein a signal containing the machine-readable identification data is separated from a radio frequency signal sent over the coaxial cable by a BIAS-T.

Example 17

A machine-readable medium that stores instructions which when performed by a machine, cause the machine to perform operations comprising: receiving at a wireless module, a machine-readable identification data from an antenna module coupled to the wireless module via a physical connection;

modifying one or more parameters of the wireless module based on the received machine-readable identification data.

Example 18

The machine-readable medium of example 17, wherein the one or more parameters includes at least one of: an amplitude, a frequency, a firmware configuration, or a tuning profile.

Example 19

The machine-readable medium of any one of the previous examples, wherein the instructions for modifying one or more parameters of the wireless module includes instructions, which when performed by the machine, cause the machine to perform the operations comprising: inhibiting the output of a radio frequency signal generated by a radio frequency processor and a baseband processor to the antenna module.

Example 20

The machine-readable medium of any one of the previous examples, wherein the instructions for modifying one or more parameters of the wireless module includes instructions, which when performed by the machine, cause the machine to perform the operations comprising: comparing the received identification information to one or more expected values, and responsive to determining that the received identification information equals one of the expected values, selecting a parameter profile which indicates modifications to the one or more parameters of the wireless module.

Example 21

The machine-readable medium of any one of the previous examples, wherein the instructions include instructions which when performed by the machine, cause the machine to perform the operations comprising: sending a request from the wireless module to the antenna module for requesting the machine-readable identification data.

Example 22

The machine-readable medium of any one of the previous examples, wherein the identification is received over a center conductor of a coax cable coupling the wireless module to the antenna module, and wherein the wireless module separates a signal containing the machine-readable identification data from a radio frequency signal using a BIAS-T.

Example 23

A wireless communication device for sending and receiving data, the wireless communication device comprising: a wireless module coupled via a physical connection to an antenna module including machine-readable identification information, the wireless module comprising a hardware processor to: receive the machine-readable identification data via the physical connection from the antenna module; modify one or more parameters of the wireless module based on the received machine-readable identification data; generate one or more outgoing wireless signals for transmission via the antenna module, a characteristic of the one or more outgoing wireless signals based upon the one or more parameters of the wireless module; and receive one or more incoming wireless signals from the antenna module; and process the one or more incoming wireless signals from the antenna module.

Example 24

The wireless communication device of example 23, wherein the hardware processor is adapted to communicate within a IEEE 802.11n network by generating the one or more outgoing signals, and receiving the one or more incoming wireless signals by utilizing orthogonal frequency division multiplexing (OFDM).

Example 25

The wireless communication device of any one of the previous examples, wherein a characteristic of the one or more incoming wireless signals is based upon the one or more parameters of the wireless module.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An antenna module comprising:
an antenna; and
an identification circuit physically paired with the antenna, the identification circuit storing machine-readable identification data and arranged to provide the machine-readable identification data responsive to a request for the machine-readable identification data, the machine-readable identification data configured for regulatory compliance to enable determination of whether or not the antenna module is a non-compliant antenna module and in response to determining that the antenna is a non-compliant antenna, modify one or more parameters of a wireless module coupled with the antenna module to one of reduce an output power delivered by the antenna module and disable the wireless module to minimize a risk of the wireless module operating in a non-compliant state.

2. The antenna module of claim 1, wherein the machine-readable identification data is a serial number and is used by a physically coupled wireless module to verify that the antenna is in regulatory compliance when connected with the wireless module.

3. An antenna module comprising:
an antenna; and
an identification circuit physically paired with the antenna, the identification circuit storing machine-readable identification data and arranged to provide the machine-readable identification data responsive to a request for the machine-readable identification data, the machine-readable identification data configured for regulatory compliance,
wherein the request is sent over a coaxial connection between the antenna module and the wireless module along with an RF signal and wherein the wireless module includes a BIAS-T which is arranged to separate the request from the RF signal.

4. The antenna module of claim 3, wherein the request is routed to the identification circuit and the RF signal is routed to the antenna.

5. A wireless module coupled via a physical connection to an antenna module including machine-readable identification information, the wireless module comprising:

a hardware processor to:
  receive the machine-readable identification information via the physical connection from the antenna module;
  determine whether or not the antenna module is a non-compliant antenna module based on the machine-readable identification information; and
  in response to determining that the antenna module is a non-compliant antenna module modify one or more parameters of the wireless module to one of reduce an output power delivered by the antenna module and disable the wireless module to minimize a risk of the wireless module operating in a non-compliant state based on the received machine-readable identification information for regulatory compliance.

6. The wireless module of claim 5, wherein the one or more parameters includes at least one of: an amplitude, a frequency, a firmware configuration, or a tuning profile.

7. The wireless module of claim 5, wherein the one or more parameters includes parameters configured to match settings of the wireless module with the antenna to optimize performance.

8. The wireless module of claim 5, wherein the hardware processor is configured to:
  verify that the antenna module is configured to operate at least one of within a range, within limits, and with a performance specified for radio circuits within the wireless module by determining that an identifier in the machine-readable identification information at least one of matches an expected number and is within a predefined or approved range of unique identifiers.

9. The wireless module of claim 5, wherein the machine-readable identification information comprises a unique identifier that is dependent on the wireless module to which the antenna module is connected.

10. A wireless module coupled via a physical connection to an antenna module including machine-readable identification information, the wireless module comprising:
  a hardware processor to:
    receive the machine-readable identification information via the physical connection from the antenna module; and
    modify one or more parameters of the wireless module based on the received machine-readable identification information for regulatory compliance, and
  a radio frequency processor and a baseband processor arranged to output a radio frequency signal to the antenna module, and wherein to modify one or more parameters of the wireless module, the hardware processor is arranged to inhibit the output of the radio frequency signal to the antenna module.

11. A wireless module coupled via a physical connection to an antenna module including machine-readable identification information, the wireless module comprising:
  a hardware processor to:
    receive the machine-readable identification information via the physical connection from the antenna module; and
    modify one or more parameters of the wireless module based on the received machine-readable identification information for regulatory compliance,
  wherein the hardware processor is arranged to modify one or more parameters of the wireless module based on the received machine-readable identification information by comparing the received machine-readable identification information to one or more expected values, and responsive to determining that the received machine-readable identification information equals one of the expected values, selecting a parameter profile which indicates modifications to the one or more parameters of the wireless module.

12. The wireless module of claim 5, wherein the hardware processor is to: send a request from the wireless module to the antenna module for requesting the machine-readable identification information.

13. The wireless module of claim 5, wherein the physical connection is established with a coaxial cable and wherein the hardware processor is arranged to receive the machine-readable identification information over a center conductor of the coaxial cable, and wherein the wireless module comprises a BIAS-T, which is arranged to separate a signal containing the machine-readable identification information from a radio frequency signal.

14. A method of modifying parameters of a wireless module, the method comprising:
  receiving at the wireless module, a machine-readable identification information from an antenna module coupled to the wireless module via a physical connection;
  determining whether or not the antenna module is a non-compliant antenna module based on the machine-readable identification information; and
  in response to determining that the antenna module is a non-compliant antenna module, modifying one or more parameters of the wireless module to one of reduce an output power delivered by the antenna module and disable the wireless module to minimize a risk of the wireless module operating in a non-compliant state based on the received machine-readable identification information for regulatory compliance.

15. The method of claim 14, wherein the one or more parameters includes at least one of: an amplitude, a frequency, a firmware configuration, or a tuning profile.

16. The method of claim 14, comprising:
  sending a request from the wireless module to the antenna module for requesting the machine-readable identification information.

17. The method of claim 14, wherein the physical connection is established with a coaxial cable and wherein the machine-readable identification information is received over a center conductor of the coaxial cable, and wherein a signal containing the machine-readable identification information is separated from a radio frequency signal sent over the coaxial cable by a BIAS-T.

18. A method of modifying parameters of a wireless module, the method comprising:
  receiving at the wireless module, a machine-readable identification information from an antenna module coupled to the wireless module via a physical connection; and
  modifying one or more parameters of the wireless module based on the received machine-readable identification information for regulatory compliance,
  wherein modifying one or more parameters of the wireless module includes inhibiting the output of a radio frequency signal generated by a radio frequency processor and a baseband processor to the antenna module.

19. A method of modifying parameters of a wireless module, the method comprising:
  receiving at the wireless module, a machine-readable identification information from an antenna module coupled to the wireless module via a physical connection; and
  modifying one or more parameters of the wireless module based on the received machine-readable identification information for regulatory compliance,
  modifying one or more parameters of the wireless module based on the received machine-readable identification information comprises comparing the received machine-readable identification information to one or more expected values, and responsive to determining that the received machine-readable identification information equals one of the expected values, selecting a parameter profile which indicates modifications to the one or more parameters of the wireless module.

20. A wireless communication device for sending and receiving data, the wireless communication device comprising:
a wireless module coupled via a physical connection to an antenna module including machine-readable identification information, the wireless module comprising a hardware processor arranged to:
receive the machine-readable identification information via the physical connection from the antenna module;
modify one or more parameters of the wireless module based on the received machine-readable identification information;
generate one or more outgoing wireless signals for transmission via the antenna module, a characteristic of the one or more outgoing wireless signals based upon the one or more parameters of the wireless module;
receive one or more incoming wireless signals from the antenna module; and
process the one or more incoming wireless signals from the antenna module.

21. The wireless communication device of claim 20, wherein the hardware processor is adapted to communicate within a IEEE 802.11n network standard by generating the one or more outgoing signals, and receiving the one or more incoming wireless signals by utilizing orthogonal frequency division multiplexing (OFDM).

22. The wireless communication device of claim 20, wherein a characteristic of the one or more incoming wireless signals is based upon the one or more parameters of the wireless module.

* * * * *